(12) United States Patent
Orchard

(10) Patent No.: US 12,600,490 B2
(45) Date of Patent: Apr. 14, 2026

(54) VEHICLE HYDROGEN FIRE DETECTION DEVICE

(71) Applicant: Zero Emissions Aerospace Limited, Bristol (GB)

(72) Inventor: Matthew Noel Orchard, Bristol (GB)

(73) Assignee: Zero Emissions Aerospace Limited, Bristol (GB)

( * ) Notice: Subject to any disclaimer, the term of this patent is extended or adjusted under 35 U.S.C. 154(b) by 445 days.

(21) Appl. No.: 18/453,264

(22) Filed: Aug. 21, 2023

(65) Prior Publication Data

US 2024/0059426 A1 Feb. 22, 2024

(30) Foreign Application Priority Data

Aug. 22, 2022 (EP) .................................... 22191442

(51) Int. Cl.
*B64D 45/00* (2006.01)
*B64C 1/14* (2006.01)
*C10L 3/00* (2006.01)

(52) U.S. Cl.
CPC .............. *B64D 45/00* (2013.01); *C10L 3/006* (2013.01); *B64C 1/1423* (2013.01); *B64D 2045/009* (2013.01); *C10L 2230/18* (2013.01)

(58) Field of Classification Search
None
See application file for complete search history.

(56) References Cited

U.S. PATENT DOCUMENTS

| | | | |
|---|---|---|---|
| 3,553,665 | A | 1/1971 | Trumble |
| 5,153,722 | A * | 10/1992 | Goedeke .............. G08B 17/125 |
| | | | 348/161 |
| 6,521,364 | B1 * | 2/2003 | Autenrieth .............. C10L 1/003 |
| | | | 429/51 |
| 6,851,483 | B2 * | 2/2005 | Olander ............. A62C 99/0045 |
| | | | 169/59 |
| 11,241,599 | B2 * | 2/2022 | Enk ......................... A62C 37/04 |
| 2005/0082068 | A1 | 4/2005 | Schneider |
| 2022/0128401 | A1 * | 4/2022 | Sipilä ...................... G01J 1/429 |
| 2022/0306310 | A1 | 9/2022 | Sibbach et al. |

FOREIGN PATENT DOCUMENTS

| | | | | |
|---|---|---|---|---|
| EP | 4063275 | A2 | 9/2022 | |
| JP | 6225219 | B1 * | 11/2017 | .............. F24C 15/06 |

OTHER PUBLICATIONS

Schmidtchen, U., E. Behrend, H-W. Pohl, and N. Rostek. "Hydrogen aircraft and airport safety." Renewable and sustainable energy reviews 1, No. 4 (1997): 239-269.

* cited by examiner

*Primary Examiner* — Edwin C Gunberg
(74) *Attorney, Agent, or Firm* — Smartpat PLC

(57) ABSTRACT

A fire detection device is designed to make hydrogen fires detectable in aviation operations and similar applications, whether it is for the purpose of detecting a fire around an aircraft prior to passenger and crew emergency evacuation, or to identify fires in proximity to airport ground vehicles that utilise hydrogen as a fuel or vehicles that are used for transporting or transforming hydrogen in any transport context. The device can be designed to be non-toxic and safe for use in proximity to humans.

16 Claims, 9 Drawing Sheets

1

VEHICLE HYDROGEN FIRE DETECTION DEVICE

CROSS-REFERENCE TO RELATED APPLICATION

This application claims the benefit of European Patent Application EP 22191442.7, filed on Aug. 22, 2022, the contents of which is incorporated by reference in its entirety.

TECHNICAL FIELD

This disclosure relates to a safety device to detect and make visible hydrogen fires in transport vehicle and aviation applications where hydrogen is used or stored on an aircraft, associated ground vehicles or similar transport applications.

BACKGROUND

To create new environmentally friendly ways to power vehicles like aircraft, the use of new fuels such as hydrogen are being promoted. Hydrogen however brings some new safety issues that are different from traditional aircraft safety cases which must be addressed before acceptance and certification of this fuel type for regular commercial aviation use will be achieved. One key issue is that of hydrogen fires, as hydrogen burns with a near non-visible clear flame, which is hard to detect by human eye both in daylight and nighttime conditions. This issue is equally problematic for road and water borne transport applications.

This clear burning flame means if a hydrogen fire occurs around the aircraft, particularly as part of a safety event with minimally trained passengers present, the possibility exists of persons walking, running or driving directly into a burning fire as it cannot be easily seen by the naked human eye. The potential risks of this non-visible fire affects passengers and crew of the aircraft, the refuelling crew, and aircraft crash safety crew alike.

Most industrial uses of hydrogen typically use infrared and ultra-violet sensors combined with computer imaging technology and some form of electronic display to visualise hydrogen fires for safety purposes. There is a large body of literature and patents for such types of technology. Whilst these devices can be remarkably accurate, they require specific equipment which would be impractical to outfit and train for its operation all the passengers on a hydrogen fuelled aircraft. Indeed, if an operator of such device has to alternate between a visual view of their surroundings and a screen view, there is also a high risk of disorientation creating an additional safety risk. Such devices may also be difficult to orientate towards and give sufficient breadth of coverage to observe any fire occurrence prior to opening the emergency exits of an aircraft after an emergency event. This would increase the risk to the passengers and crew if a door or emergency exit was incorrectly opened adjacent to a fire.

Hydrogen fires burn quickly if the fuel is fully exposed to the atmosphere, as the fuel both burns and evaporates. Current aircraft cabin evacuation rules also require all passengers and crew to evacuate the aircraft within a period of 90 seconds after the instruction to evacuate is given. This means the first minutes of any aircraft crash when passengers are normally expected to evacuate are most critical to identify and avoid any flames until the fire is burnt out. Therefore, any hydrogen fire detection system must be easy to use and quick to operate.

The present inventors judge that what is required is a hydrogen fire detection device that can make a hydrogen fire visible to all actors in an emergency event, and not a single operator with specialised equipment, nor a device that has a specific training requirement or reliance on a secondary display. Such a device should be able to be carried on an aircraft safely, without constituting or creating its own safety risk due to its carriage. It should also be able to be operated prior to the opening of the aircraft cabin doors and emergency exits to avoid inadvertent opening of the aircraft exits adjacent to a fire whilst flames are still burning in proximity to the door. Similarly, versions of the device should be able to triggered or operated by refuelling crews or emergency crews if a hydrogen fire was suspected, including wider transport applications such as for road accidents or shipping incidents. Such a device would ideally be operated systematically in approach to treating a hydrogen aircraft (or other transport vehicle) after serious damage to an aircraft to ensure any hydrogen fires would be easily identified by all persons coming into proximity of the aircraft, hydrogen refueller or airport hydrogen infrastructure.

SUMMARY

The invention can be executed in several forms for aviation and wider transport applications. For example, it is considered appropriate for use on an aircraft, on a refuelling vehicle, on a crash vehicle and for use in person portable forms.

The invention is configured to disperse, suitably following fluidisation, a flame colourant, such as a flame colourant powder or flame colourant liquid, that displays a colour in the presence of a hydrogen flame. That is, activation of the device when the dispersed colourant encounters a hydrogen flame it will change the colour of the flame to a colour that is in the visible spectrum. In the case of a hydrogen flame this will change it from a non-visible form to a visible form.

A first aspect of the invention provides a fire detection device configured to increase visibility of a hydrogen flame, the device including: a container containing a flame colourant for displaying a colour in the presence of a hydrogen flame; and a disperser for dispersing the colourant.

The flame colourant may be of any suitable type leading to an emission of visible light in the visible spectrum in the presence of a hydrogen flame.

The term, "displaying a colour" as used herein can refer to any emission in the visible spectrum. Suitably, the visible spectrum may be defined as wavelengths from about 380 to about 750 nanometres.

In various embodiments, the flame colourant may lead to an emission of violet (380-450 nm), blue (450-485 nm), cyan (485-500 nm), green (500-565 nm), yellow (565-590 nm), orange (590-625 nm), red (625-750 nm), or combinations thereof. The displayed colour may suitably refer to any of these, or combinations thereof.

Unless context requires otherwise, the term "hydrogen flame" is used herein to refer to a flame produced by burning hydrogen in air, or at least in the presence of some oxygen. Such a flame may already emit some light in the visible spectrum, though detection and visibility is a challenge. The flame colourant may suitably enhance the emission of visible light and/or vary its wavelength. Advantageously, the flame can thus become more detectable.

The flame colourant may comprise or consist of one or more flame colourant elements or compounds and optionally one or more carriers, solvents or auxiliary elements or compounds.

The flame colourant or one or more of its constituent ions/atoms may have an emission spectrum so as to emit visible light in the presence of a hydrogen flame.

Suitable flame colourant elements or compounds may be identified by reference to known emission spectra or for example using flame emission spectroscopy.

Elements with suitable spectra include Al, As, B, Ba, Be, Bi, C, Ca, Cd, Ce, Co, Cr, Cs, Cu, Ge, Fe, Hf, Hg, In, K, Li, Mg, Mn, Mo, Na, Nb, Ni, P, Pb, Ra, Rb, Sb, Sc, Se, Sn, Sr, Ta, Te, Ti, Tl, V, W, Y, Zn, Zr. Thus, in principle, the flame colourant may comprise or consist of one or more of these elements or their compounds.

However, advantageously, the flame colourant may be chosen to mitigate or avoid potentially adverse secondary effects. For example, preferably, a flame colourant element or compound, or indeed the flame colourant as a whole may be selected not to react exothermically, for example by oxidisation, in the presence of a hydrogen flame. Additional heat would be potentially harmful in some applications.

On the contrary, advantageously, a flame colourant element or compound, or indeed the flame colourant as a whole, may be capable of absorbing energy or undergoing an endothermic process in the presence of a hydrogen flame.

Toxicity, availability, or ease of dispersion may also be a consideration in choosing the flame colourant. However, where appropriate, mitigation or avoidance of potentially adverse secondary effects may be balanced with the desire for particular emission levels or spectra.

In various embodiments, the flame colourant may comprise or consist of one or more of the following elements or their compounds (e.g. salts): Al, Be, Bi, C, Ca, Cd, Co, Cr, Cu, Ge, Fe, In, K, Li, Mg, Mn, Mo, Na, Nb, Ni, P, Pb, Rb, Sb, Sc, Se, Sn, Sr, Te, Ti, Tl, V, W, Y, Zn, Zr.

Advantageously, a flame colourant may comprise one or more metals, metal elements or metal compounds. Suitably, the flame colourant may comprise metal ions. Conveniently, the flame colourant may comprise one or more metal salts. Examples of suitable counter-ions include halide, nitrate, or sulphate.

Advantageously, the flame colourant may comprise or consist of one or more of the following elements or their compounds (e.g. salts): Al, Be, Ca, Cd, Co, Cr, Cu, Fe, K, Li, Mg, Mn, Ni, Pb, Sb, Sc, Sn, Sr, V, W, Y, Zn, Zr.

Suitable metals include, for example, alkali or alkali earth metals, or transition metals. Transition metals include any element in the d-block of the periodic table, which includes groups 3 to 12 on the periodic table.

Preferred alkali metals include (Li), sodium (Na), and potassium (K). Preferred alkali earth metals include magnesium (Mg), calcium (Ca), and strontium (Sr). Preferred transition metals include Mn, Fe, Co, Ni, Cu and Zn. In some embodiments, a flame colourant compound may comprise Cu(I), Cu(II), Fe (II), or Fe (III). For example, suitable metal salts include sodium chloride, potassium chloride, strontium chloride, lithium chloride, copper sulphate, or copper chloride. Preferably, the flame colourant comprises a flame colourant powder comprising particles of a metal salt.

In preferred embodiments the flame colourant can comprise or consist of sodium chloride (yellow, orange or yellow-orange flame) or potassium chloride (lilac or purple flame) as both these salts will create a change in the colour of the flame and are non-toxic to persons.

Such salts, or other suitable flame colourant powders in particle form, are however hygroscopic so embodiments of the invention may involve measures to avoid the uptake of water that may compromise the free flow of the powder, particularly after a period of storage. This can be by sealing the powder, ideally in a vacuum, the use of dehumidifying agents, or even a light wax coating of the particles themselves can be possible embodiments to ensure the effective long-term storage of the powder.

Other flame colourant possibilities for use with the invention include; strontium chloride (intense red flame), but this may have harmful health side effects on unprotected persons and can be corrosive affecting other parts of the vehicle; lithium chloride (pink flame), but this is very hygroscopic making storage more difficult; copper sulphate (green flame), but this is an irritant and can be toxic to persons; copper chloride (blue flame), but this is corrosive and may also be toxic to people.

In preferred embodiments the flame colourant comprises a flame colourant powder comprising particles configured to display a colour in the presence of a hydrogen flame. This arrangement is understood to provide a higher concentration of metal salts than liquid alternatives, and is considered easy to store.

In other embodiments the flame colourant may comprise a liquid. For example, a metal salt dissolved in a solvent. The skilled person will be able to readily identify a suitable solvent for a particular metal salt. Possible example solvents may include alcohol, water, or acid such as hydrochloric acid.

In embodiments in which the flame colourant comprises a flame colourant powder, the powder is preferably stored in an appropriate container, to ensure that water absorption into the powder does not take place, nor will the container allow the powder to escape in a way where it could cause corrosion in other parts of the vehicle. Thus, the container may be sealed to prevent ingress of moisture. The container may be sealed to provide a vacuum or near-vacuum.

The disperser preferably includes a means for fluidizing the flame colourant powder in the container. As the skilled person will be aware, fluidization is a process whereby a bed of solid particles is transformed into a fluid-like state. When fluidized, the flame colourant powder can flow much like a fluid.

For example, the disperser may include a cannister containing a compressed gas, and an intake configured to deliver gas from the cannister to a base of the container to thereby fluidize the flame colourant powder. Suitable gases include carbon dioxide, nitrogen or air.

The disperser may further include a gas-porous fluidizing base within the container supporting the flame colourant powder, and a plenum chamber beneath the fluidizing base, and the intake may be configured to deliver gas from the cannister to the plenum chamber. The disperser preferably further includes an outlet nozzle and an outlet conduit configured to deliver flame colourant powder from above the fluidizing base to the outlet nozzle. Such an arrangement provides a particularly simple and efficient way to achieve fluidization of the flame colourant powder.

Alternatively, the intake may include a fluidizer nozzle configured to eject the compressed gas into the flame colourant powder to thereby fluidize the powder.

The skilled person will understand that other arrangements suitable for fluidizing the flame colourant powder may be substituted for those described herein.

The container preferably forms part of the fluidiser for the powder, with a suitable plenum or entry port extending into the powder to introduce a compressed gas, and one or more exit ports to eject the fluidised powder through one or more appropriately orientated nozzles to cover the desired area with the fluidised powder. The compressed gas that is the means to fluidise and propel the powder out of the nozzles, can be carbon dioxide, nitrogen or air in preferred embodiments.

The device preferably includes a trigger device configured to activate the disperser. Thus, the fire detection device can be operated at an appropriate time or location.

In some embodiments the trigger device includes a manually activated switch configured to activate the disperser. Such an arrangement may be particularly advantageous for portable applications of the fire detection device.

The fire detection device may include a sensor configured to detect a hydrogen flame and the trigger device may be configured to activate the disperser in response to detection by the sensor of a hydrogen flame. Such an arrangement may be particularly advantageous for applications of the fire detection device where passive operation is beneficial. For example, the sensor may be configured to detect heat and/or light emitted by a flame. Optionally, the sensor comprises an infrared or ultraviolet sensor configured to detect infrared or ultraviolet electromagnetic radiation, respectively.

Alternatively, the trigger device may include a heat-activated component configured to activate in the presence of excess heat to thereby activate the disperser. For example, the component may be normally closed to prevent ingress of a compressed gas into the container, and configured to open in the presence of excess heat to permit ingress of a compressed gas into the container. Again, such an arrangement may be particularly advantageous for applications of the fire detection device where passive operation is beneficial. The heat-activated component may comprise, e.g. thermo-mechanical fuse, thermo-mechanical valve, or other component configured to open or otherwise change configuration to permit ingress of a compressed gas into the container when exposed to excess heat. Excess heat may comprise heat from a flame such as a flame from a hydrogen fire.

The compressed gas can be stored in one or more cannisters that are activated (or opened) by a mechanical action. This could be a one-shot breaking of the sealing of the cannister for a single-use system, or a fused connection, for instance that is activated by the pulling of an emergency cord. Alternatively for applications where multiple use is needed the cannister may comprise a valve that can be both opened and closed to selectively activate the device as required. In alternate embodiments where passive activation is desirable or required, for instance to activate when a fire was not anticipated or suspected, then the rupture of the seal of the cannister may be triggered by heat causing the breakage, such as a heat activated fuse. Alternatively, the trigger may come from a connected digital imaging sensor (using technology like infrared or ultraviolet sensing) that electronically detects and triggers the unsealing of the cannister. Consequentially any of these activations and release of the compressed gas would result in the fluidisation and ejection of the flame colourant powder to cover any flames and make them visible to the naked eye.

In embodiments in which the flame colourant comprises a liquid, the disperser may comprise an aerosol spray device configured to generate an aerosol mist of liquid particles. For example, the disperser may comprise a container housing the flame colourant liquid and a propellant, and a valve having open and closed positions. The propellant is held at a pressure higher than an atmospheric pressure such that movement of the valve to the open position causes the flame colourant liquid to be expelled via the valve as an aerosol, or mist. A suitable propellant will be non-flammable. Tetrafluoropropene is considered a suitable propellant in some embodiments.

Suitable applications for such passively operated embodiments may include refuelling vehicles, fuel transport vehicles or fixed installations where a fire would not normally be expected, and thus 'automatically' making flames visible to operators and personal if a fire is present will increase the safety of the personal. For emergency vehicles, such as common-use fire trucks or specialised aircraft crash vehicles, the application of the invention will in preferred embodiments be a multiple use system that can be switched on and off on demand if a hydrogen fire is suspected, potentially as a standard practice in approaching a hydrogen fuelled vehicle to ensure the safety of approach. For such emergency applications a handheld portable variation of the invention can also be employed, of either single or multi-use type, which can be carried and aimed and directed by an emergency worker at any potential hydrogen fire locations.

For emergency use on a vehicle, which may be an aircraft, whilst a handheld portable system may be useful for a fully trained crew member, to anticipate use by passengers with limited training (typically restricted to the pre-flight briefing) a fixed dispersion single-use system may be employed at one or more cabin exit positions. In this case the dispersion pattern of the device nozzles shall be such that they fully cover the potential egress directions of passengers and crew, and the flame colourant contents of the container(s) and the compressed gas in the propellant cannister(s) shall be sufficient to last until any potential fire has burnt out and/or the occupants have sufficient time to observe the area free of fire and evacuate the aircraft. Such a fixed dispersion system in preferred embodiments may be activated by a mechanical activation by a cord, although both valve types and digital flame sensor activation systems embodiments may optionally be employed.

In some applications, the fire detection device may comprise a portable housing containing the container and the means for dispersing the flame colourant, the portable housing being configured to be held and directed by a user. Such portable user-operated devices may be particularly useful in some applications by trained users, as described above.

A second aspect of the invention provides an emergency exit door defining an escape route, and a fire detection device according to the first aspect. Optionally the disperser is configured to disperse the flame colourant at or towards the escape route.

A third aspect of the invention provides a vehicle comprising a fire detection device according to the first aspect or an emergency exit door according to the second aspect.

A fourth aspect of the invention provides a method of detecting a hydrogen flame, the method comprising activating a fire detection device according to the first aspect, and detecting the presence of a hydrogen flame if particles in the dispersed flame colourant display a colour. The method may further include operating the trigger device to activate the disperser.

Further aspects of the invention are defined in the following numbered clauses.

1. The application of a fluidised flame colouring powder or flame colouring fluid ejected into the presence of a detected or suspected non-visible hydrogen flames to change the flame colour to be visible to the naked eye as a means to ensure the safety of passengers, crew, ground staff and emergency staff in the proximity of hydrogen powered vehicles such as a hydrogen fuelled aircraft.

2. In relation to Clause 1 the use of sodium chloride, Potassium chloride, Strontium chloride, Lithium chloride, Copper sulphate, or Copper chloride in the form of a fine powder or dissolved in an appropriate fluid to change the colour of a near non-visible hydrogen flame into a coloured flame to make it visible to the naked eye as an aid to safety.

3. In relation to Clause 1 any form of fluidiser device consisting of a compressed gas cannister, compressed gas, a valve or fuse to selectively release the compressed gas, a container to hold the flame colourant powder with a plenum or a intake, and one or more output nozzles from the container for the purpose of fluidising and ejecting a flame colourant powder to be suspended temporarily in the air.

4. In relation to Clauses 1 to 3, such a device that is person portable and can be directed by the operator at a suspected fire by orientating the whole device, or through the orientation of a flexible ejection nozzle that forms part of the device.

5. In relation to Clauses 1 to 3, such a system where the activation of the system is manual via the operation of a valve or the breaking of a fuse.

6. In relation to Clauses 1 to 3, such a system that is connected to an appropriate sensor that is able to detect near non-visible flames, including the use of digital imaging, to create an electrical trigger that enables the automatic activation of the valve or fuse to activate the system when a hydrogen flame is detected.

7. In relation to Clauses 1 to 3 where the fuse or valve is thermo-mechanically coupled and heat from a flame would cause the fuse or valve to activate and the system to eject fluidised flame colouring powder.

8. In relation to Clauses 1 to 3 and Clauses 5 to 7 where such a system was integrated or connected to the emergency exit of an aircraft or similar vehicle that was powered by hydrogen or had stored hydrogen onboard.

9. In relations to Clauses 1 to 3 and Clauses 6 and 7 where one or more such protection systems were a fixed to a refuelling vehicle or transport vehicle to cause fluidised flame colouring powder to be ejected automatically in the presence of a flame and in a dispersion pattern of the flame colourant powder that would cover all possible orientations of hydrogen flames surrounding the vehicle.

10. In relations to Clauses 1 to 3 and Clauses 5 to 7 where one or more such systems were a fixed to an emergency vehicle to be used in conjunction with possible hydrogen fires, to allow both the automatic and manual ejection of fluidised flame colouring powder in one discharge or multiple discharges.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
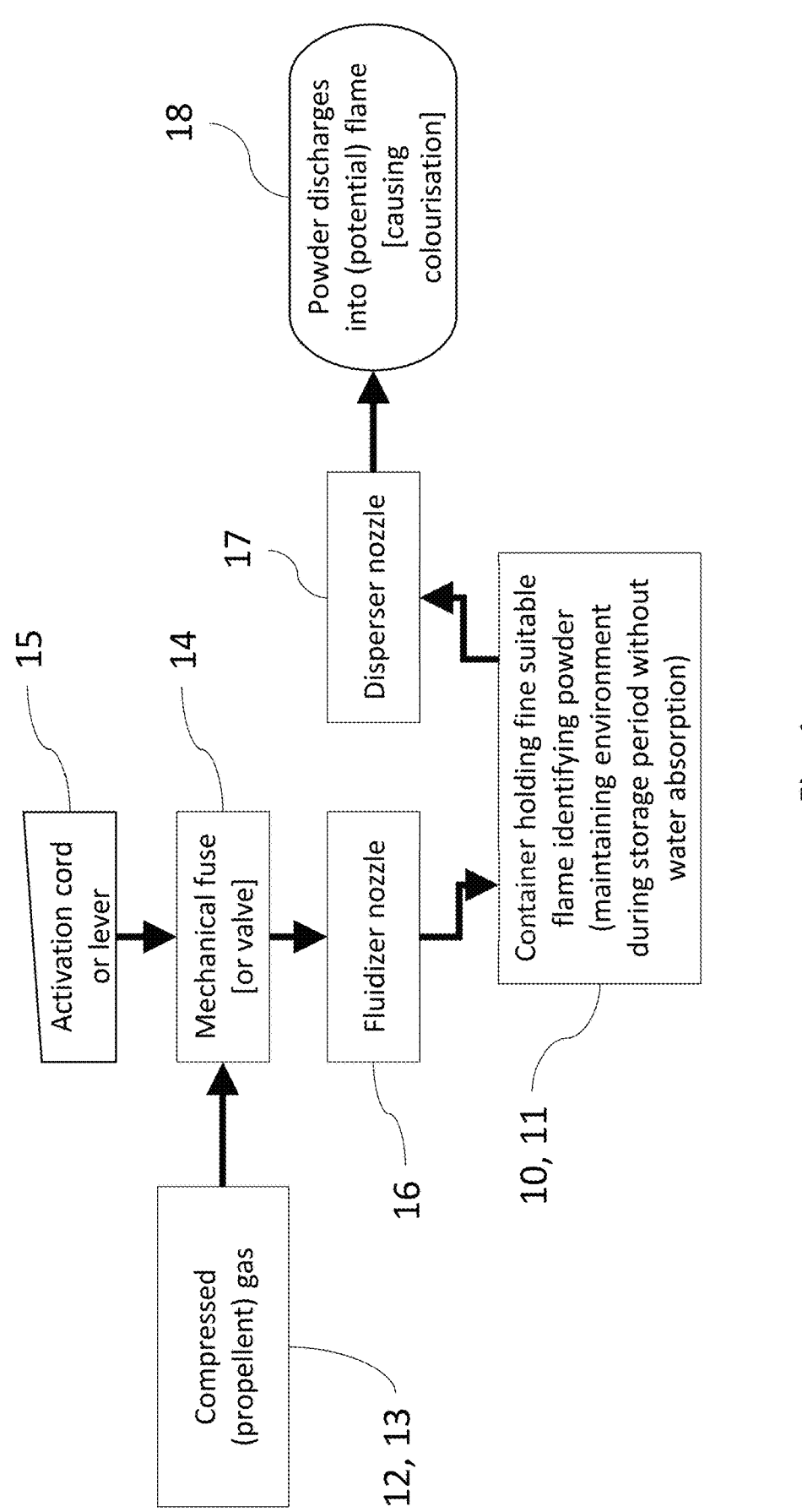
FIG. 1 illustrates the system logic of the invention, both single-use and multi-use, with direct activation.

FIG. 1 shows the logic for a direct activation embodiment of the invention, which requires manual intervention to trigger the operation of the device. The core of the device is the flame colourant powder 10, which in preferred embodiments can be finely ground sodium chloride (orange flame) or potassium chloride (purple flame) and is used to colour the otherwise largely invisible hydrogen flame to the naked eye. This powder is held in a container 11 prior to use that avoids moisture ingress and absorption by the flame colourant powder 10 and restricts the flame colourant powder 10 from escaping into other parts of the vehicle where it may cause corrosion or other types of damage.

Figure 3:
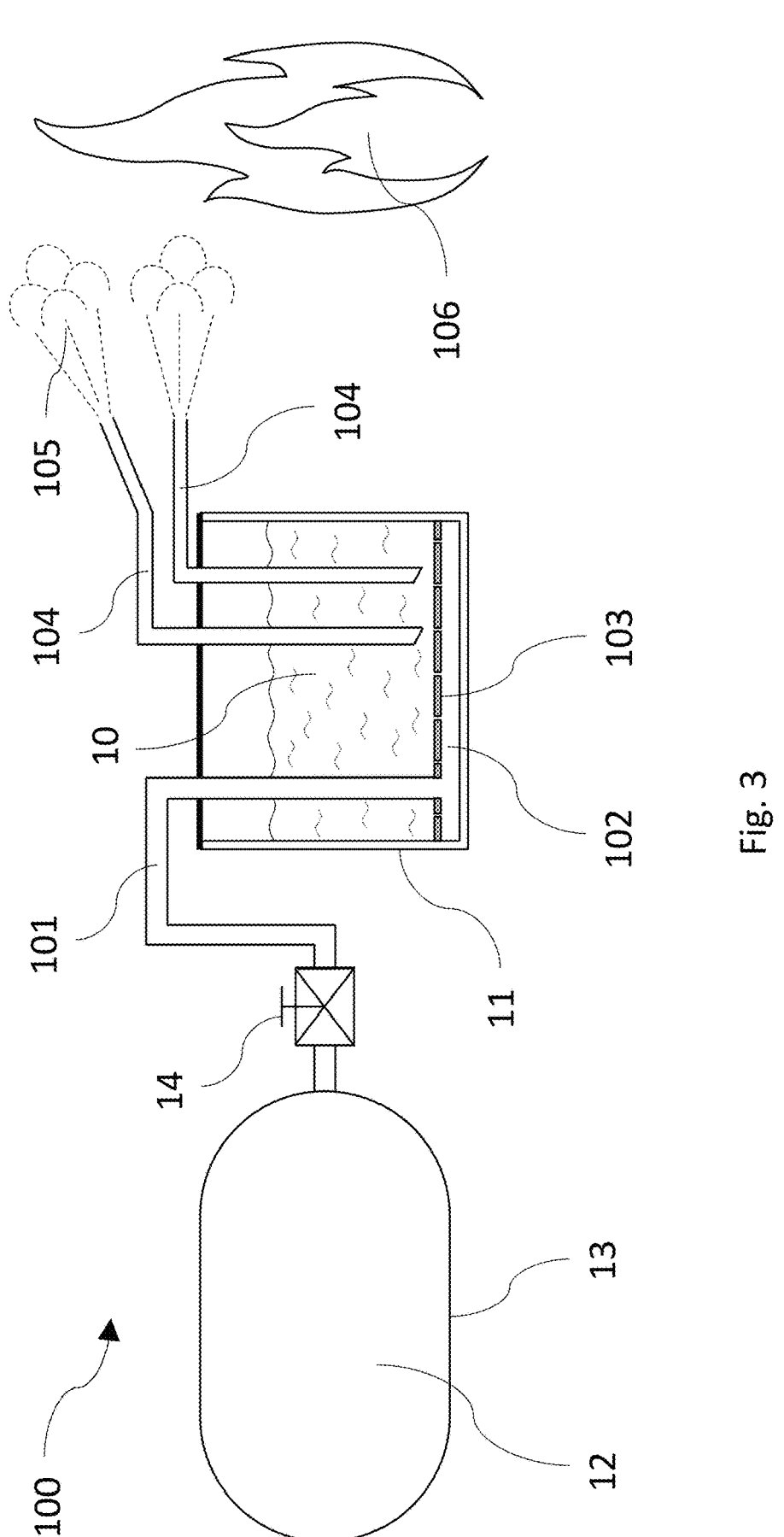
FIG. 3 illustrates an embodiment of the invention, using direct activation of the device to release the compressed gas and eject the fluidised powder on a possible flame.
Figure 4:
FIG. 4 illustrates an embodiment of the invention with passive activation, using a sensor to activate release the compressed gas and eject the fluidised powder on a possible flame detection.
Figure 5:
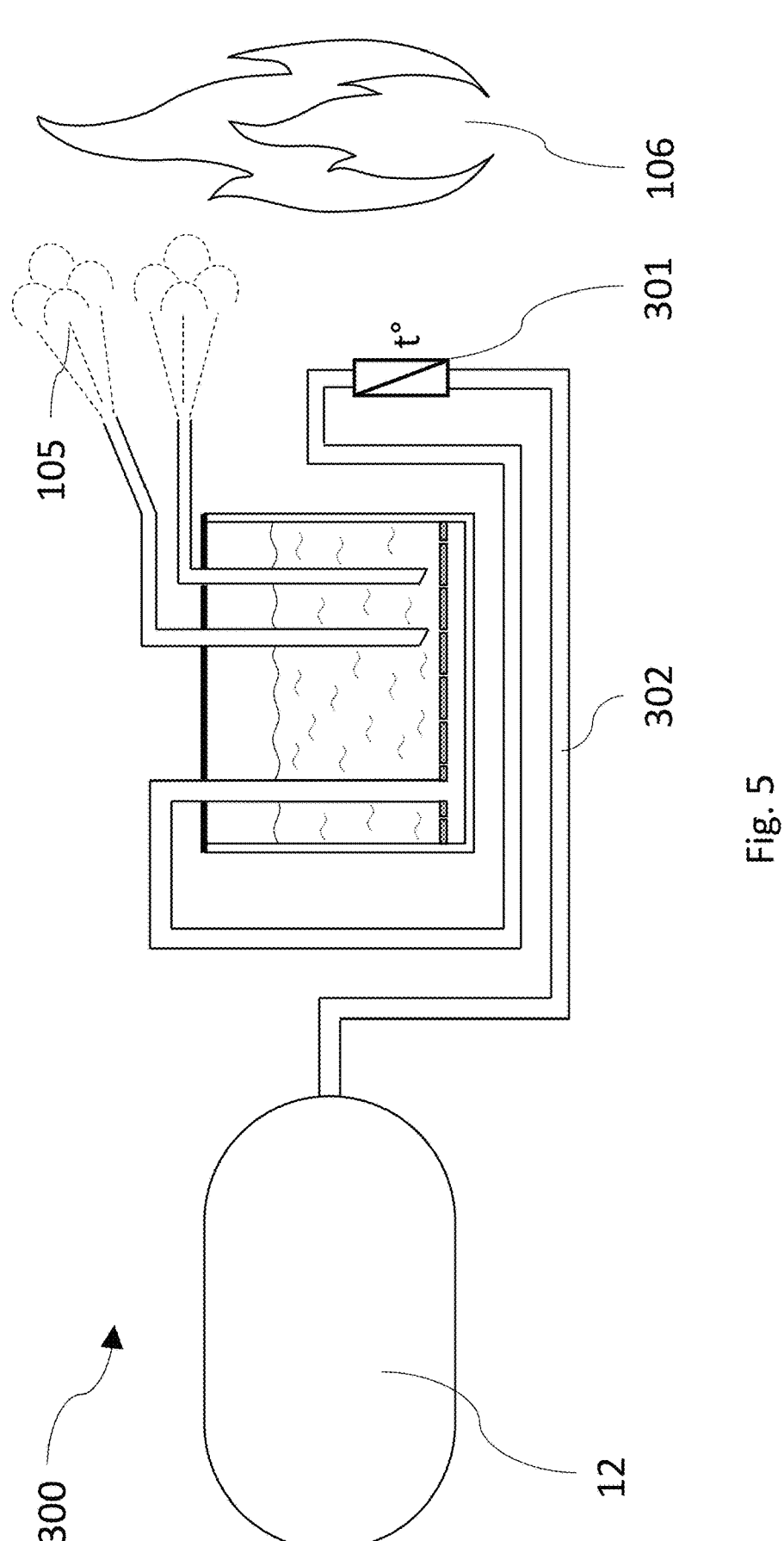
FIG. 5 illustrates an embodiment of the invention with passive activation, using a heat activated fuse to release the compressed gas and eject the fluidised powder on a possible flame.

The flame colourant powder 10 is fluidised and ejected by a compressed propellant gas 12 stored in a cannister 13, which on activation of a fuse or valve 14 by the actuation of an emergency cord or lever 15, will release the compressed propellant gas 12 into the flame colourant powder 10 to thereby fluidize the flame colourant powder 10. This is achieved by, for example, ejecting the propellant gas 12 through either a plenum and fluidizing base (as illustrated in FIGS. 3-5) or a fluidizer nozzle 16. This will cause the fluidized flame colourant powder 10 to be ejected via the disperser nozzle(s) 17 as a powder discharge 18 in the direction targeted by the disperser nozzle(s) 17.

If the powder discharge 18 is dispersed in an area in which there is a hydrogen flame, then the reaction of the flame colourant powder 10 with the flame will cause the flame to change colour, and will make a near non-visible hydrogen flame visible. That is, the flame colourant powder 10 will emit visible light in the presence of the flame so that a colour is displayed. Suitable substances for the flame colourant powder 10 include metal salts, such as sodium chloride or potassium chloride. In such preferred embodiments the near non-visible flame will appear orange if sodium chloride is used, or purple if potassium chloride is used. This will make the nearly invisible hydrogen flame fully visible to the naked eye of any persons in proximity to the flame. Alternative embodiments may use other powders for the flame colourant powder 10, such as Strontium chloride (intense red flame), Lithium chloride (pink flame), Copper sulphate (green flame), Copper chloride (blue flame), or others, but these powders often have negative effects such as toxicity that make their use less desirable.

Figure 2:
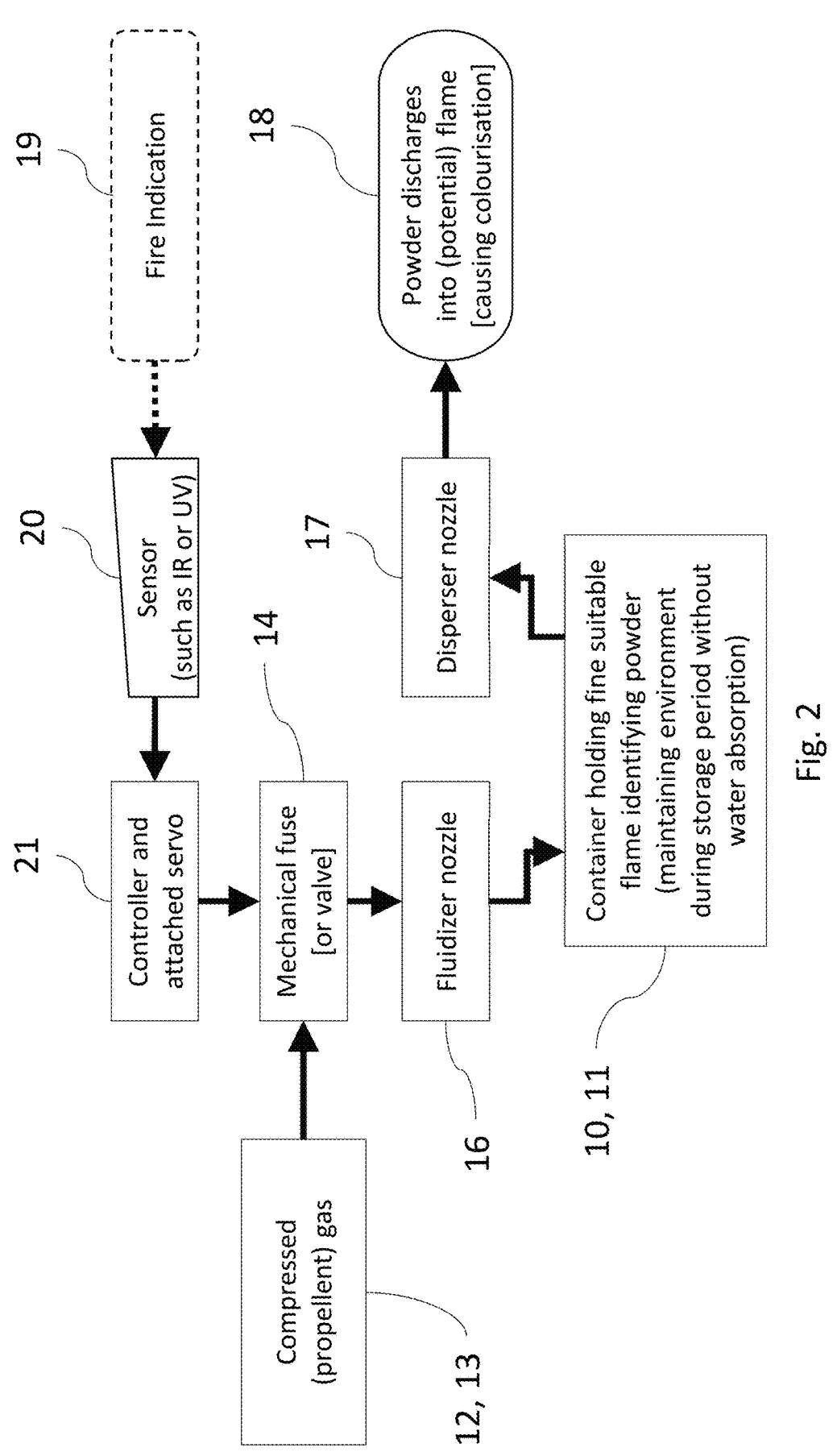
FIG. 2 illustrates the system logic of the invention, both single-use and multi-use, with passive or automatic activation.

FIG. 2 shows a variation of the invention, with the same or similar flame colourant powder 10, container 11, compressed propellant gas 12, cannister 13, fuse or valve 14, fluidizer nozzle 16 and disperser nozzle(s) 17. The difference in this embodiment of the invention is the direct intervention of an operator is not necessary for the dispersal of the flame colourant powder 10. If a flame indication 19 is present in the dispersal area, as a sensor 20 is positioned to detect its presence, the indication will trigger the automatic activation of a motor or servo 21 to open the fuse or valve 14 to release the compressed propellant gas 12. This will then fluidise the flame colourant powder 10 and eject the powder discharge 18 in the direction targeted by the disperser nozzle(s) 17, to thereby cause any hydrogen flame in the dispersal area to change to a visible colour. The sensor 20 may optionally be an infrared or ultra-violet sensor connected to a digital imagining system to detect the presence of flames in some embodiments. Optionally the sensor 20 and fuse or valve may be replaced with a thermal mechanical fuse that activates in the presence of excess heat from a fire and performs the same function of triggering the device automatically in the presence of a flame to disperse the flame colourant powder 10, thereby making a hydrogen flame visible.

FIG. 3 shows an embodiment of the invention with manual activation 100. Manual activation 100 may be appropriate for emergency services applications, where the emergency crews will want to be able to selectively disperse the detection powder on demand and may also need to make multiple applications. Similarly, manual activation 100 may be appropriate for single use activation prior to opening cabin doors in the event of evacuation from a hydrogen fuelled aircraft. FIG. 3 shows the flame colourant powder 10 in its stored state within the container 11. Whilst any powder fluidizer concepts might be optionally adapted to use with the invention, FIG. 3 shows a preferred embodiment with a disperser including a pressurisation intake 101, and a plenum 102 beneath a fluidizing base in the form of a porous membrane 103.

To activate the fluidization the compressed propellant gas 12, which is stored in an appropriate cannister 13, can be manually released via the intake 101 by opening the valve 14. The valve 14 may optionally be replaced with a single-use mechanical fuse in some embodiments. For example, a suitable single-use mechanical fuse may be normally closed, but be configured to permanently open in the presence of heat indicative of a fire. The container 11 is sealed, and when the valve 14 is opened the compressed propellant gas 12 will be forced into the plenum 102 via the intake 101, from where it rises through the porous membrane 103 and into the powder causing it to aerate and fluidize. The fluidized powder 105 is then forced in a loose state suspended in the compressed propellant gas 12 through the pickup tube and nozzle(s) 104. This fluidized powder 105 is then ejected from the pickup tube and nozzle(s) 104, and if there is a flame 106 present the reaction of the flame 106 with the colourant powder 10 will change the flame from largely invisible to the colour determined by the choice of flame colourant powder 10.

Optionally there may be one or more than one pickup tube and nozzle(s) 104 to allow several orientations to be covered with the dispersed fluidized powder 105. The pickup tube and nozzle 104 may optionally be flexible and able to be directed by the operator in a chosen direction, or the pickup tube and nozzle(s) 104 may be fixed in a predetermined orientation applicable to the application, such as the siting of an aircraft emergency exit. For emergency operator use in person portable applications the operator may be able to direct the whole device at a potential fire location if the configuration of the device is small enough, or through the use of a flexible nozzle 104.

If a particular application requires that the device be able to be activated multiple times, then the cannister 13 shall have a sufficiently large volume to ensure that enough compressed propellant gas 12 will be available. Similarly, the volume of the container 11 should allow for sufficient additional flame colourant powder 10 if multiple activations are required.

FIG. 4 shows an alternative embodiment of the invention, where the invention is passively triggered and electrically activated 200 without the need of an operator. This is enabled by a sensor(s) 201 which is connected to a servo 202 that actuates the valve 14 (or the mechanical fuse, in variations of this embodiment). In such an embodiment, digital imaging technology may be used with the sensor to increase the detectability of any potential hydrogen flames. In other respects the features of this embodiment are the same as those described above in relation to for the embodiment depicted in FIG. 3.

In this embodiment if a hydrogen flame 106 is present and detected by an appropriate sensor(s) 201, such as an infrared or ultra-violet sensor(s), this will trigger a signal that will be used to activate the electric or electro-mechanical servo 202 that will open the valve 14 (or break the mechanical fuse, in variations of this embodiment), thereby releasing the compressed propellant gas 12 via the intake. This will operate the system in a similar way to that described above in relation to FIG. 3. That is, by releasing the fluidized powder 105 into the flame 106 with the consequential reaction of the colourant powder 10 with the flame 106 causing a change of a hydrogen flame from a largely invisible transparent flame to the colour determined by the choice of flame colourant powder 10.

FIG. 5 shows another alternative embodiment, where the activation of the system is passive but thermo-mechanically activated 300 by the presence of the heat from a flame 106. With all the other elements of the system similar to the description given for FIG. 3, this embodiment has one or more thermo-mechanical fuse(s) 301 positioned in a location (s) on the vehicle where the presence of a flame 106 would constitute a danger. To enable this positioning of the thermo-mechanical fuse(s) 301 the pressurisation line 302 may require to be extended to ensure an optimum positioning. If a fire occurs on or near to the vehicle, then a flame 106 occurring in the regions covered by the placement of the thermo-mechanical fuse(s) 301 will cause the thermo-mechanical fuse(s) 301 to break and therefore release the compressed propellant gas 12. This will operate the system in much the same way described for FIG. 3, by releasing the fluidized powder 105 into the flame 106 with the reaction of the colourant powder 10 with a hydrogen flame 106 causing a change to the flame from largely invisible to the colour determined by the choice of flame colourant powder 10. The skilled reader will understand that the thermo-mechanical fuse(s) 301 may be replaced by a thermo-mechanical valve, or other component configured to open, or otherwise change configuration, in response to heat from a flame 106 to thereby release the compressed propellant gas 12.

Figure 6A:
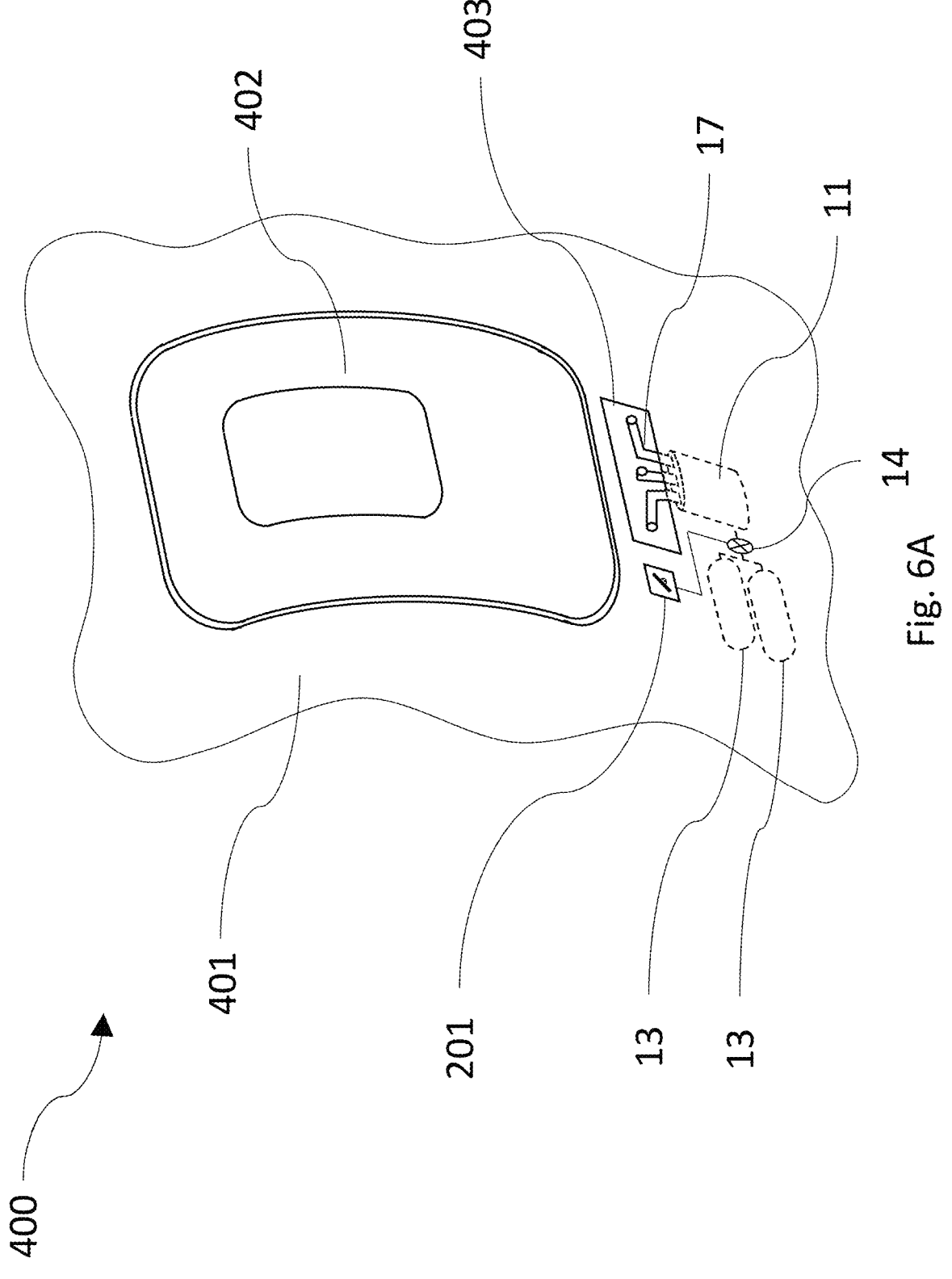
FIGS. 6A-C illustrate an embodiment of the invention for use with an aircraft door or emergency exit.
Figure 6B:
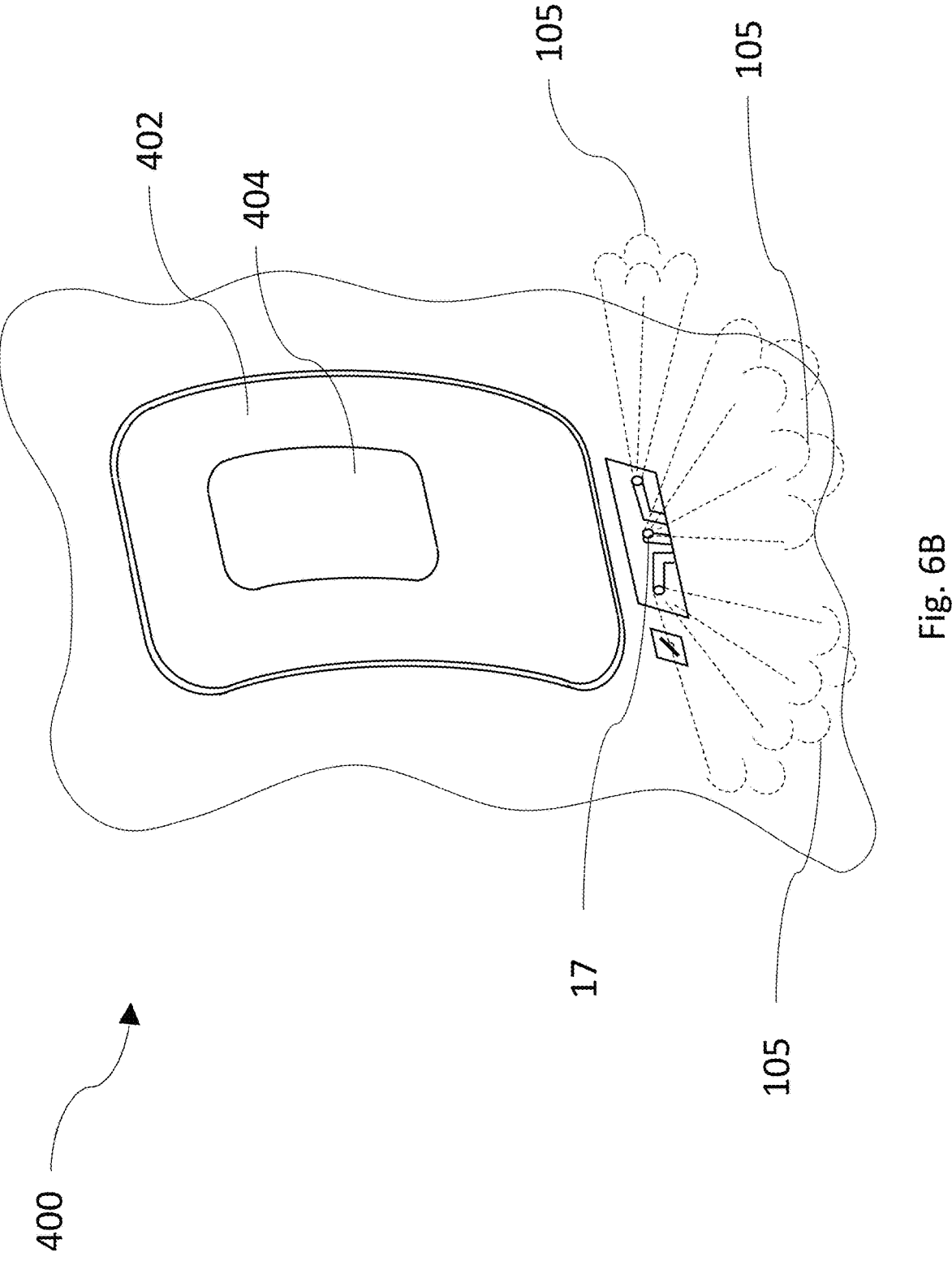
Figure 6C:
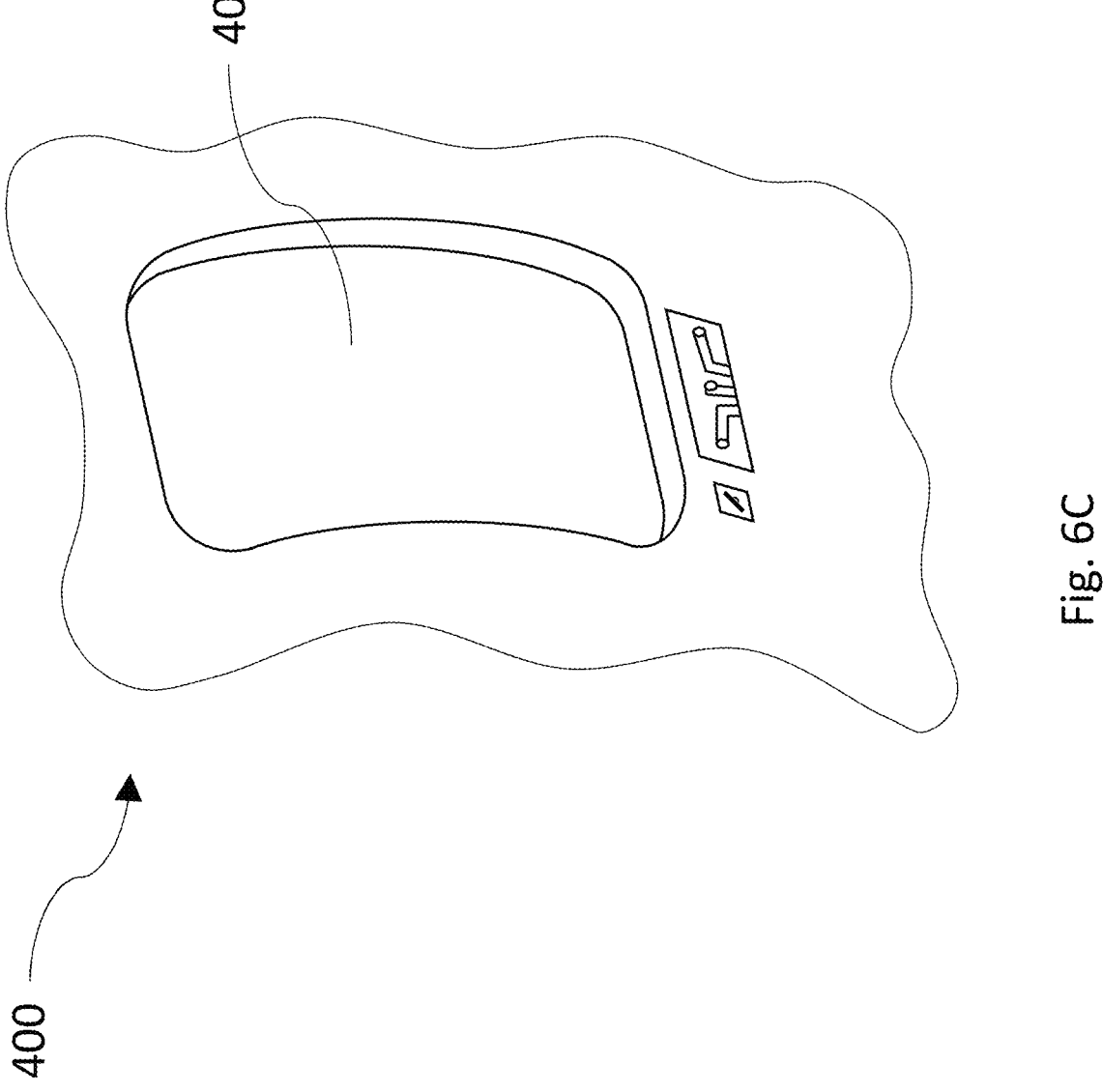

FIG. 6 illustrates an embodiment of the invention in which a fire detection device according to the invention is incorporated into a door and doorframe couple or evacuation exit of an aircraft 400. The illustration shows a preferred sequence of embodiment for an emergency evacuation of an aircraft using the invention, starting with an illustration of the installation in its non-activated state in FIG. 6A. In an emergency the invention would be activated as shown in FIG. 6B with the exit door remaining in its closed state, either manually or automatically, causing the flame colourant powder 10 to be dispersed. Subsequently in FIG. 6C once a responsible occupant confirms that there were no flames present thanks to the reaction of the flame colourant powder 10 with any flames, then the emergency exit door can be opened and the occupants can safely evacuate the aircraft.

FIG. 6A illustrates a partial section of an aircraft fuselage 401 in which a door or emergency exit 402 defining an escape route is installed. At some suitable location surrounding the emergency exit 402 a flame colourant powder dispersal panel 403 is positioned that will allow one or more disperser nozzle(s) 17 to be orientated to give a desired coverage of colourant powder 10 into or towards the escape route when the system is activated. A suitable location may be above, below or to either side of the emergency exit 402, or even a location independent of the door, such as a wing fairing in line of sight of the emergency exit 402. In the FIG. 6 illustrations the flame colourant powder dispersal panel 403 itself is omitted for clarity, to show a preferred embodiment of the disperser nozzle(s) 17, but in normal non-emergency vehicle operations this area would be covered by the flame colourant powder dispersal panel 403 to present a smooth external surface of the aircraft to the airflow and to protect the system from ingress of contaminants. The dispersal panel 403 comprises a detachable panel that is ejected when the device is triggered. Alternate embodiments may not include a flame colourant powder dispersal panel 403 and instead have the disperser nozzle(s) 17 connected individually directly to the external aircraft fuselage 401 so that they extend through the fuselage surface panel(s). In such an embodiment the disperser nozzle(s) 17 will be fitted with a plug to protect against contamination ingress that would be ejected by the pressure of the compressed propellant gas 12 when the system is activated. The plug will provide a smooth aerodynamic surface flush with the fuselage surface panel (s).

FIG. 6A also illustrates that all elements of the invention, including the container 11, cannister(s) 13 and fuse or valve 14, in preferred embodiments can be installed in the cabin side wall cavity, that is in the space between the cabin side wall and the aircraft fuselage 401. The system in some embodiments can be manually activated as part of the emergency sequence for the operation of the door, potentially with the activation being directly connected to the mechanical unlocking sequence of the emergency exit 402. FIG. 6A also illustrates the optional installation of an appropriate sensor(s) 201, such as an infra-red or ultra-violet sensor(s), on the aircraft fuselage 401 in a suitable location to detect the presence of a flame. In such embodiments presence of a flame will trigger a signal that will be used to activate an electric or electro-mechanical servo 202 that will open the valve 14.

FIG. 6B illustrates the next part of the sequence of an emergency evacuation exit of an aircraft 400, where the manual or automated activation of the system causes a suitably dispersed pattern of the fluidized powder 105 to cover all possible egress routes through the positioning of the disperser nozzle(s) 17 to ensure no flames 106 are present in the egress area from the exit. At this stage of the evacuation sequence the emergency exit 402 remains in position to protect the occupants of the aircraft from any flames 106 occurring externally to the cabin. The occupants, whether crew or passengers, will observe visually from a suitable window 404, either installed in the emergency exit 402 or adjacent to the emergency exit 402, to confirm no flame 106 is made visible by the fluidized powder 105 before opening the emergency exit 402. The container 11 and cannister 13 will contain sufficient flame colourant powder 10 and propellant gas 12, respectively, to ensure that there is sufficient flame colourant powder 10 and compressed propellant gas 12 respectively to continually eject fluidized powder 105 for the time necessary for a fire to burn out or all liquid hydrogen to boil off if it is spilled. The length of time for dispersion of the flame colourant powder 10 or embodiment sequence could also include a time duration after the emergency exit 402 is opened.

Once the occupants have observed that no flames 106 are present visually thanks to the ejected fluidized powder 105, then FIG. 6C illustrates that the emergency exit 402 can be safely removed, creating the opening from the aircraft 405 through which the occupants can exit the aircraft without risk of egressing into a non-visible flame. Optionally the ejection of fluidized powder 105 may continue for a period of time after the emergency exit 402 is removed to give an added level of safety.

Figure 7:
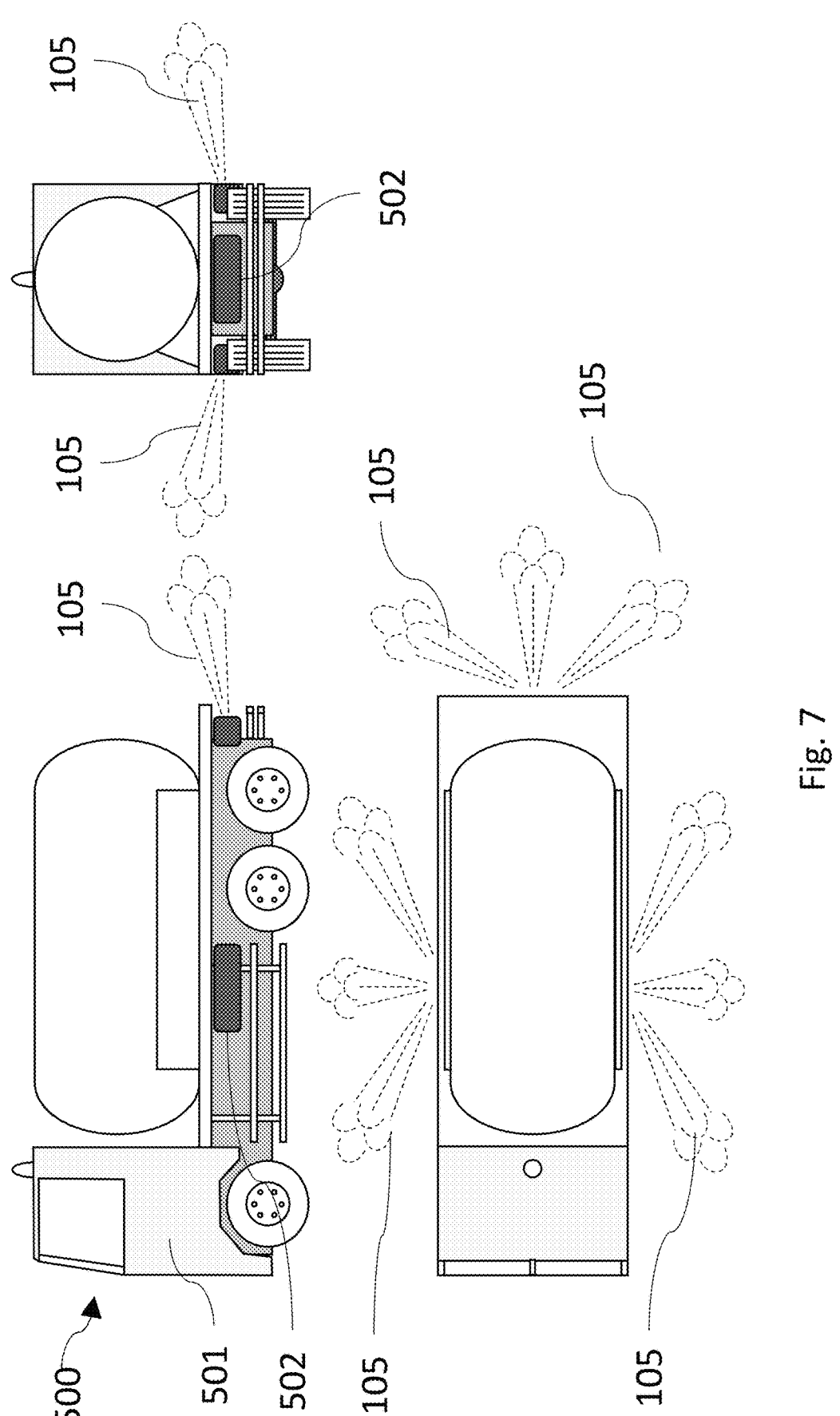
FIG. 7 illustrates an embodiment of the invention installed on a refuelling vehicle as a passively activated system.

FIG. 7 illustrates an application of the invention as a safety device 500 on a refueller vehicle 501, although similar embodiments could be made on an airport crash tender or a common-use fire truck. The refueller vehicle 501 is illustrated in 3-view, showing side, rear and plan views, to highlight that one or more hydrogen fire detection devices 502 according to the invention may be fitted to the vehicle, such that combined with the selection of appropriate orientations of the disperser nozzle(s) 17 this may give any necessary coverage up to 360 degrees surrounding the vehicle for the dispensing of the fluidized powder 105. The hydrogen fire detection devices 502 may be configured according to any embodiment of the invention.

Given that the operator of a refueller vehicle 501 is normally working alone and has other duties such that they are unlikely to suspect the presence of a fire, preferred embodiments of the invention as a safety device 500 would be passively activated using an appropriate sensor(s) 201, such as an infra-red or ultra-violet sensor(s). Such a system could trigger the one or more hydrogen fire detection systems 502 individually or collectively as required, thereby enhancing the safety of the refueller operator and any other personal working in close proximity that could be endangered by a near non-visible hydrogen flame.

What is claimed is:

1. A fire detection device configured to increase visibility of a hydrogen flame, the device comprising:
   a container containing a flame colourant; and
   a disperser configured for dispersing the flame colourant from the container to the flame,
   wherein the flame colourant comprises one or more constituent ions/atoms having an emission spectrum that emits visible light in a presence of the hydrogen flame.

2. The fire detection device according to claim 1, wherein the flame colourant comprises a powder having particles configured to display a colour in the presence of the hydrogen flame.

3. The fire detection device according to claim 1, wherein the flame colourant comprises a metal salt.

4. The fire detection device according to claim 1, wherein the flame colourant comprises a sodium salt, potassium salt, strontium salt, lithium salt, and/or copper salt.

5. The fire detection device according to claim 1, wherein the disperser includes a cannister containing a compressed gas, and an intake configured to deliver the compressed gas from the cannister to a base of the container.

6. The fire detection device according to claim 5, wherein the disperser further includes
a gas-porous fluidizing base within the container supporting the flame colourant, and
a plenum chamber beneath the fluidizing base, and
wherein the intake is configured to deliver the compressed gas from the cannister to the plenum chamber.

7. The fire detection device according to claim 6, wherein the disperser further includes an outlet nozzle and an outlet conduit configured to deliver the flame colourant from above the fluidizing base to the outlet nozzle.

8. The fire detection device according to claim 6, wherein the intake includes a fluidizer nozzle configured to eject the compressed gas into the flame colourant.

9. The fire detection device according to claim 1, further comprising a trigger device configured to activate the disperser.

10. The fire detection device according to claim 9, wherein the trigger device includes a manually-activated switch configured to activate the disperser for dispersing the flame colourant.

11. The fire detection device according to claim 9,
further comprising a sensor configured to detect the hydrogen flame,
wherein the trigger device is configured to activate the disperser in response to detection by the sensor of the hydrogen flame.

12. The fire detection device according to claim 11,
wherein the sensor comprises an infrared or ultraviolet sensor.

13. The fire detection device according to claim 9, wherein the trigger device includes a heat-activated fuse configured to activate in the presence of excess heat to thereby activate the disperser.

14. The fire detection device according to claim 1, further comprising a portable housing containing the container and the disperser for dispersing the flame colourant, the portable housing being configured to be held and directed by a user.

15. An emergency exit door defining an escape route, and a fire detection device comprising:
a container containing a flame colourant; and
a disperser for dispersing the flame colourant;
wherein the flame colourant comprises one or more constituent ions/atoms having an emission spectrum that emits visible light in a presence of a hydrogen flame and
wherein the disperser is configured to disperse the flame colourant at or towards the escape route.

16. A vehicle comprising a fire detection device including:
a container containing a flame colourant; and
a disperser configured for dispersing the flame colourant from the container to the flame,
wherein the flame colourant comprises one or more constituent ions/atoms having an emission spectrum that emits visible light in a presence of a hydrogen flame.

* * * * *